(12) United States Patent
Otsuka et al.

(10) Patent No.: US 7,197,295 B2
(45) Date of Patent: Mar. 27, 2007

(54) PORTABLE COMMUNICATION DEVICE

(75) Inventors: Shuji Otsuka, Higashiosaka (JP);
Hideji Kawasaki, Neyagawa (JP);
Hiroomi Kashu, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 301 days.

(21) Appl. No.: 10/020,948

(22) Filed: Dec. 19, 2001

(65) Prior Publication Data
US 2002/0077123 A1 Jun. 20, 2002

(30) Foreign Application Priority Data
Dec. 20, 2000 (JP) ............... 2000-387460

(51) Int. Cl.
*H04M 11/00* (2006.01)
(52) U.S. Cl. ................ 455/404.2; 455/406; 455/456.1; 455/464; 379/60; 379/39; 345/7; 345/6
(58) Field of Classification Search ............. 455/456.2, 455/456.1, 457, 406, 404.2, 464; 348/231.99, 348/143; 379/60, 39; 345/7, 6
See application file for complete search history.

(56) References Cited

U.S. PATENT DOCUMENTS 6,525,768 B2 * 2/2003 Obradovich ........... 348/231.99

FOREIGN PATENT DOCUMENTS

| JP | 10-150625 | 6/1998 |
| JP | 11-41669 | 2/1999 |
| JP | 2000-181814 | 6/2000 |

* cited by examiner

*Primary Examiner*—Charles Appiah
*Assistant Examiner*—Randy Peaches
(74) *Attorney, Agent, or Firm*—Armstrong, Kratz, Quintos, Hanson & Brooks, LLP

(57) ABSTRACT

A portable communication device including a GPS antenna, a GPS processing circuit for determining a location of the device based on a signal received by the antenna, a location information processing circuit for detecting the location information corresponding to a determined result, a key input device for inputting a telephone number of a communication terminal device for transmitting the location information, a control circuit, and a transmitting circuit. The key input device is provided with a LOST key. The control circuit feeds the location information detected by the location information processing circuit to the transmitting circuit when the LOST key is manipulated. The transmitting circuit transmits the location information to the communication terminal device having the inputted telephone number. This realizes a portable communication device which is adapted to notify others of the accurate present location of the device.

8 Claims, 8 Drawing Sheets

PORTABLE COMMUNICATION DEVICE

BACKGROUND OF THE INVENTION

1. Field of the Invention

The present invention relates to portable communication devices including portable telephones, etc., and more particularly to portable communication devices having a positioning function such as GPS (Global Positioning System), etc., for use in Car Navigation System.

2. Description of the Related Art

Portable telephones are convenient when its user has a rendezvous with others. In the case where the user gets lost on the way to a rendezvous point, the user places a call or sends a message to a party whom the user is scheduled to meet, to notify the party of the present location of the user and ask the party how the user can get to the rendezvous point. This enables the user to reach the rendezvous point without getting lost, with the result that the user can meet the party.

However, with conventional portable telephones, when the user gets lost, the user may have no idea of his present location, so that the user cannot notify the party whom the user is scheduled to meet of the accurate present location of the user. This entails the problem that the party cannot tell the user precisely the way to the rendezvous point.

Portable telephones, in recent years, equipped with an image pickup device such as a CCD (Charge Coupled Device) camera are in wide use. When the user having a portable telephone of this type gets lost, the user may photograph his surrounding landscape and buildings, sending image data obtained by the photography to the party whom he is scheduled to meet in order to notify the party of his present location.

However, with the portable telephone of this type, in the case where the party knows his way about the vicinity in which the user gets lost, the party can identify the present location of the user by looking at a landscape image or buildings which image data sent by the user shows. On the other hand, in the case where the party does not know his way about the vicinity in which the user gets lost, the party does not identify the present location of the user by looking at a landscape image or buildings which image data sent by the user shows, presenting the problem that the party cannot tell the user precisely the way to the rendezvous point. Further, in the case where the user gets lost in the vicinity having a number of similar landscapes, even if the party knows his way about the vicinity, there arises the problem that the party may mistake the present location of the user and, as a result, inform the user of an erroneous rout to the rendezvous point.

SUMMARY OF THE INVENTION

An object of the present invention is to provide a portable communication device which enables its user to notify others of an accurate present location of the user.

A video camera having a positioning function like GPS (Global Positioning System), etc., for use in car navigation systems is known (JP-A No. 98323/1997). A user of a video camera of this type performs manipulation for recording an image to have recorded in a memory medium image data obtained from photography by a CCD camera and location information indicating a location of the device determined by the GPS location function.

Accordingly, the present applicants have conducted intensive research to overcome the above problem, have consequently found that the positioning function described above is introduced to the portable communication device, and have accomplished the present invention.

A portable communication device of the present invention comprises:

location data receiving means for receiving reference location data from a plurality of location base stations provided on satellites and/or the ground, location detection means for detecting location information indicating a location of the device based on the reference location data received by the location data receiving means, information input means for inputting identifying information of a communication terminal device to which the location information is to be transmitted, a send key to be manipulated when the location information is transmitted to the communication terminal device, and transmitting means for converting the location information detected by the location detection means to a radio signal and transmitting the radio signal to the communication terminal device having the inputted identifying information via a switching office of the telephone line network when the transmitting key is manipulated.

With the portable communication device of the invention described, the location information indicating the location of the device is detected based on the reference location data from a plurality of the location base stations.

When the user carrying the portable communication device gets lost, the user inputs identifying information, for example, a telephone number or an e-mail address, of communication terminal devices such as portable telephones of the party whom the user is scheduled to meet, and thereafter manipulates the send key to have the location information detected as described transmitted to the communication terminal device of the party whom the user is scheduled to meet via the switching office of the telephone line network.

The party whom the user is scheduled to meet can ascertain the accurate present location of the user getting lost by observing the location information received by the party's communication device terminal.

With the portable communication device described, the user performs manipulation for inputting the identifying information of the communication terminal device of the party whom the user is scheduled to meet and an easy manipulation to the send key, notifying the party of the accurate present location of the user.

Stated specifically, when the send key is manipulated, the transmitting means stated above converts to a radio signal notification information that the location indicated by the location information is the present location of the user, to transmit the radio signal to the communication terminal device having the inputted identifying information via the switching office of the telephone line network.

According to the specific construction described, the user getting lost manipulates the send key as stated above, to transmit the notification information that the location indicated by the location information is the present location and the location information to the communication terminal device of the party whom the user is scheduled to meet. Accordingly, the party can learn by looking at the notification information that the user getting lost is on the location indicated by the location information.

Further specifically, the portable communication device is equipped with an image pickup device. When the send key is manipulated, the transmitting means converts to a radio signal image data obtained from photography by the image pickup device to transmit the radio signal to a communication terminal device having the inputted identifying information via the switching office of the telephone line network.

With the specific construction stated above, the user getting lost manipulates the send key as described above, transmitting the image data obtained from the photography by the image pickup device and the location information to the communication terminal device of the party whom the user is scheduled to meet. Thus, the user getting lost sends image data obtained from the photography of surrounding buildings and landscape, for example, to the communication terminal device of the party whom the user is scheduled to meet, enabling the party to learn the present location of the user easily and more accurately by looking at the image of the landscape and buildings in addition to the location information.

Further specifically, the location detection means comprises:

information storage means for storing therein a plurality of items of location information including map information and/or address information, and information extraction means for extracting one item of location information indicating the location of the portable communication device out of the plurality of items of location information based on the reference location data received.

Stated specifically, transmitted to the communication terminal device of the party whom the user is scheduled to meet is the location information including the map information and/or the address information. Accordingly, the party looks at the map information and/or the address information to learn the accurate present location of the user getting lost. The location information including the map information enables the party to learn easily the present location of the user getting lost.

Stated specifically, the portable communication device comprises:

one or more displays for showing information, an image pickup key to be manipulated when the image is photographed, and transmit display processing means for showing on the one or more displays the detected location information and the image photographed by the image pickup device when the image pickup key is manipulated.

Stated specifically, when the user gets lost and manipulates the image pickup key, the location information detected as based on the reference location data from a plurality of base stations is shown on one or more displays, and the image photographed by the image pickup device is shown on the display. Therefore, the user getting lost can identify the accurate present location of himself by looking at the location information shown on the display, and check how the photographed image comes out, which is shown by the image data to be transmitted to the party whom the user is scheduled to meet, as described above.

Further specifically, the portable communication device is equipped with two displays. The transmit display processing means has the detected location information shown on one display, and has the image photographed by the image pickup device shown on the other display.

Stated more specifically, the location information and the image photographed by the image pickup device are shown on different displays, respectively, so that the location information shown on the image does not disturb the visibility of the location information, allowing both of the location information and the image to be shown clearly on the respective displays.

Further specifically, each item of location information includes map information at least. The transmit display processing means has the location of the device shown to be superposed on the map information shown on the one or more displays.

According to the specific construction, the user getting lost manipulates the image pickup key as stated above to have the map information shown on one or more displays and to have the location of the device or the present location of the user shown on the map. Accordingly, the user getting lost can learn the present location of himself easily and accurately.

Further stated specifically, the portable communication device comprises:

radio signal receiving means for receiving a radio signal from the switching office of the telephone line network, and receiving display processing means for showing on one or more displays the location information constituting the radio signal received by the radio signal receiving means and the image having the image data.

Stated specifically, the location information constituting the radio signal received by the radio signal receiving means and the image having the image data constituting the radio signal are shown on the one or more displays. Therefore, in the case where a person receives the location information and the image data transmitted by the user getting lost, the location information and the image shown on the displays enable the person to learn the accurate present location of the user.

Further specifically, the portable communication device comprises:

radio signal receiving means for receiving a radio signal from the switching office of the telephone line network, and receiving display processing means for showing on one of the displays the location information constituting a radio signal received by the radio signal receiving means, and showing on the other display the image having image data constituting the radio signal.

According to the specific construction, the received location information and the image having the image data are shown on different displays, respectively, so that the location information shown on the image does not disturb the visibility of the location information, allowing both of the location information and the image to be shown clearly on the respective displays.

As stated above, the portable communication device of the present invention enables the user to notify the others of the accurate present location of the user.

DETAILED DESCRIPTION OF THE PREFERRED EMBODIMENTS

A portable telephone embodying the invention will be described below in detail based on three preferred embodiments.

Construction of Appearance

Figure 1:
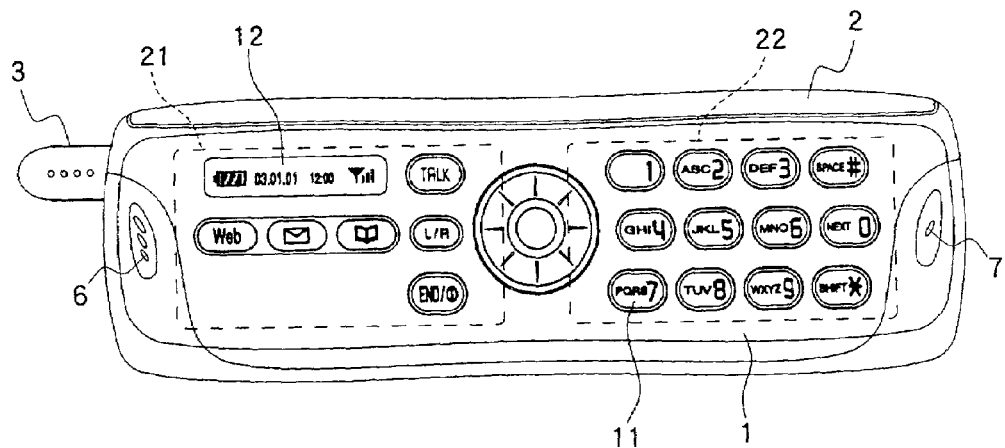
FIG. 1 is a front view showing a portable telephone having a draw panel housed therein embodying the present invention.
Figure 2:
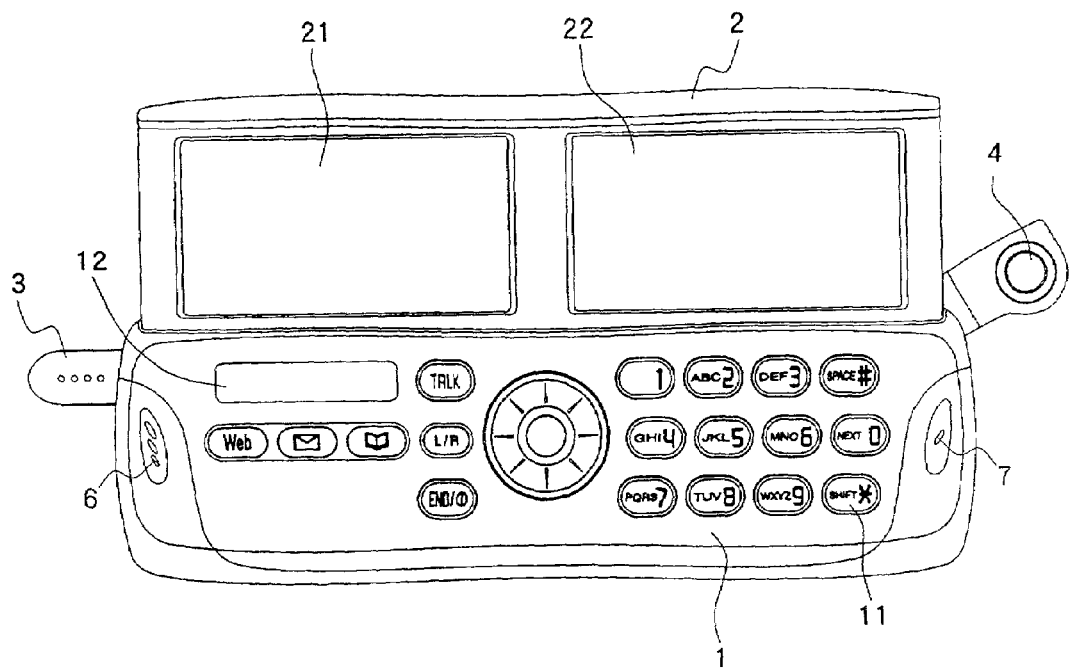
FIG. 2 is a front view showing the portable telephone having the draw panel pulled out.

The portable telephone of the present invention, as shown in FIGS. 1 and 2, comprises a flat compact casing 1 having a telephone antenna 3 projecting therefrom and provided with a key input device 11 having a plurality of manual keys. The casing 1 has a speaker 6 provided on the upper end, and a microphone 7 provided on the lower end.

Further, the casing 1 comprises a draw panel 2 having first and second displays 21, 22, each made of liquid crystal display panels, provided in combination. The draw panel 2 is provided reciprocatingly movably on a straight line in parallel to a surface of the casing 1. The panel 2 is adapted to be set into two positions, i.e., a housed position wherein the panel is housed in the casing 1 as shown in FIG. 1, and a draw position wherein the panel extends from the casing 1, as shown in FIG. 2.

Further, the casing 1 is formed with a small window 12 for exposing the upper end portion of the screen of the first display 21 on the housed position of the panel 2. The image shown on the screen of the first display 21 can be seen through the small window 12. The casing 1, as shown in FIG. 2, has a CCD camera 4 attached thereto drawably.

Construction of Circuit

Figure 3:
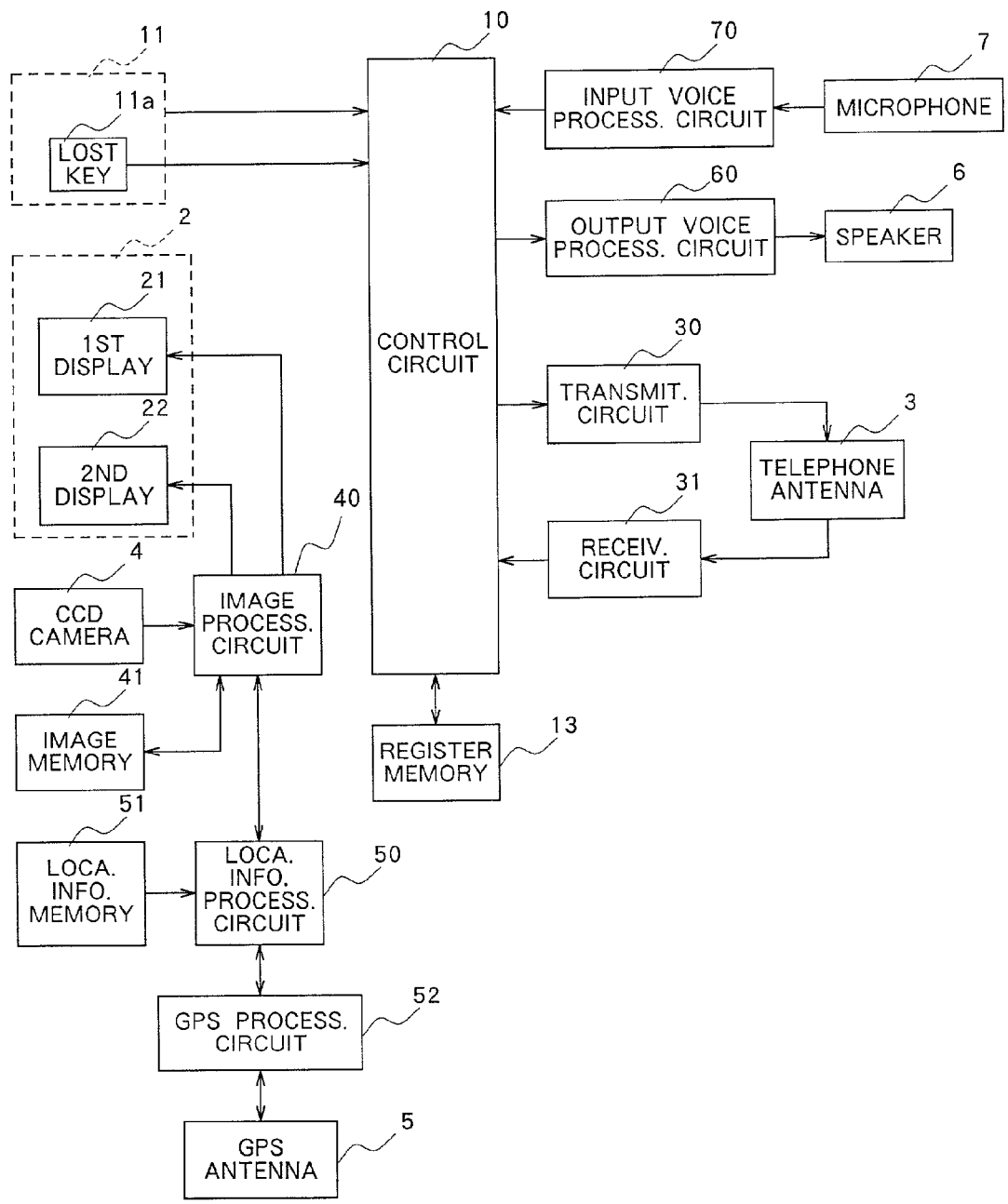
FIG. 3 is a block diagram showing the electrical construction of the portable telephone.

FIG. 3 shows the electrical construction of the portable telephone. As illustrated, a transmitting circuit 30 and a receiving circuit 31 are connected to the telephone antenna 3, respectively. A signal received by the telephone antenna 3 is fed to the receiving circuit 31 to have a speech receiving signal demodulated. The speech receiving signal is fed to an output voice processing circuit 60 via a control circuit 10 having a CPU. The signal is processed for predetermined analog conversion in the circuit 60, and thereafter fed to the speaker 6 to produce sound.

Further, a speech delivery signal inputted to the microphone 7 is fed to an input voice processing circuit 70 to have the signal processed for predetermined digital conversion, and thereafter the signal is fed to the transmitting circuit 30 via the control circuit 10 to have the signal modulated. The modulated speech delivery signal is transmitted from the telephone antenna 3.

Connected to the control circuit 10 are the key input device 11 and a register memory 13 for storing various data such as telephone numbers, e-mail addresses, and fixed expressions for messages, etc. The key input device 11 comprises, as will be described below, a "LOST" key 11a to be manipulated when the user gets lost and a photograph key (not shown).

Furthermore, the control circuit 10 is connected via an image processing circuit 40 to the first display 21 and the second display 22 as provided in combination with the draw panel 2. Shown on the displays 21, 22 is various data like time and date, a variety of menus, content of a received message, and a telephone number and name of a caller of an incoming call.

Figure 6:
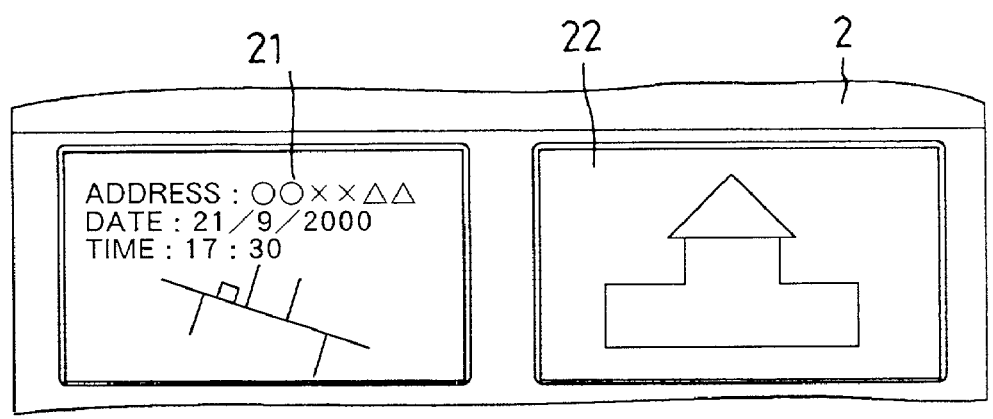
FIG. 6 is a front view showing an example of the location information and the photographed image each shown on the first display and on the second display when the location information is transmitted.

The CCD camera 4 is connected to the image processing circuit 40. The location information, current time and date information, and the image photographed by the CCD camera 4 obtained as will be stated below are shown on the first display 1 and the second display 22, respectively, as shown in FIG. 6 by the image processing circuit 40. An image memory 41 is connected to the image processing circuit 40. The image memory 41 has stored therein image data obtained from photography by the CCD camera 4 and the location information, which are related to each other.

The portable telephone has a GPS function. A signal received by a GPS antenna 5 is fed to a GPS processing circuit 52. The GPS processing circuit 52 determines a latitude and longitude of the telephone location, and current time and date based on the received signal. The determined result is fed to a location information processing circuit 50.

The location information processing circuit 50 has connected thereto a location information memory 51. The memory 51 has stored therein a latitude and longitude of the telephone location, and location information comprising map information and address information, which are related each other. The location information processing circuit 50 extracts one item of location information corresponding to the determined result by the GPS processing circuit 52 out of a plurality of items of location information stored in the location information memory 51. The extracted information is fed to the image processing circuit 40. The location information processing circuit 50 feeds the current date and time information included in the determined result by the GPS processing circuit 52 to the image processing circuit 40.

First Embodiment

Figure 4:
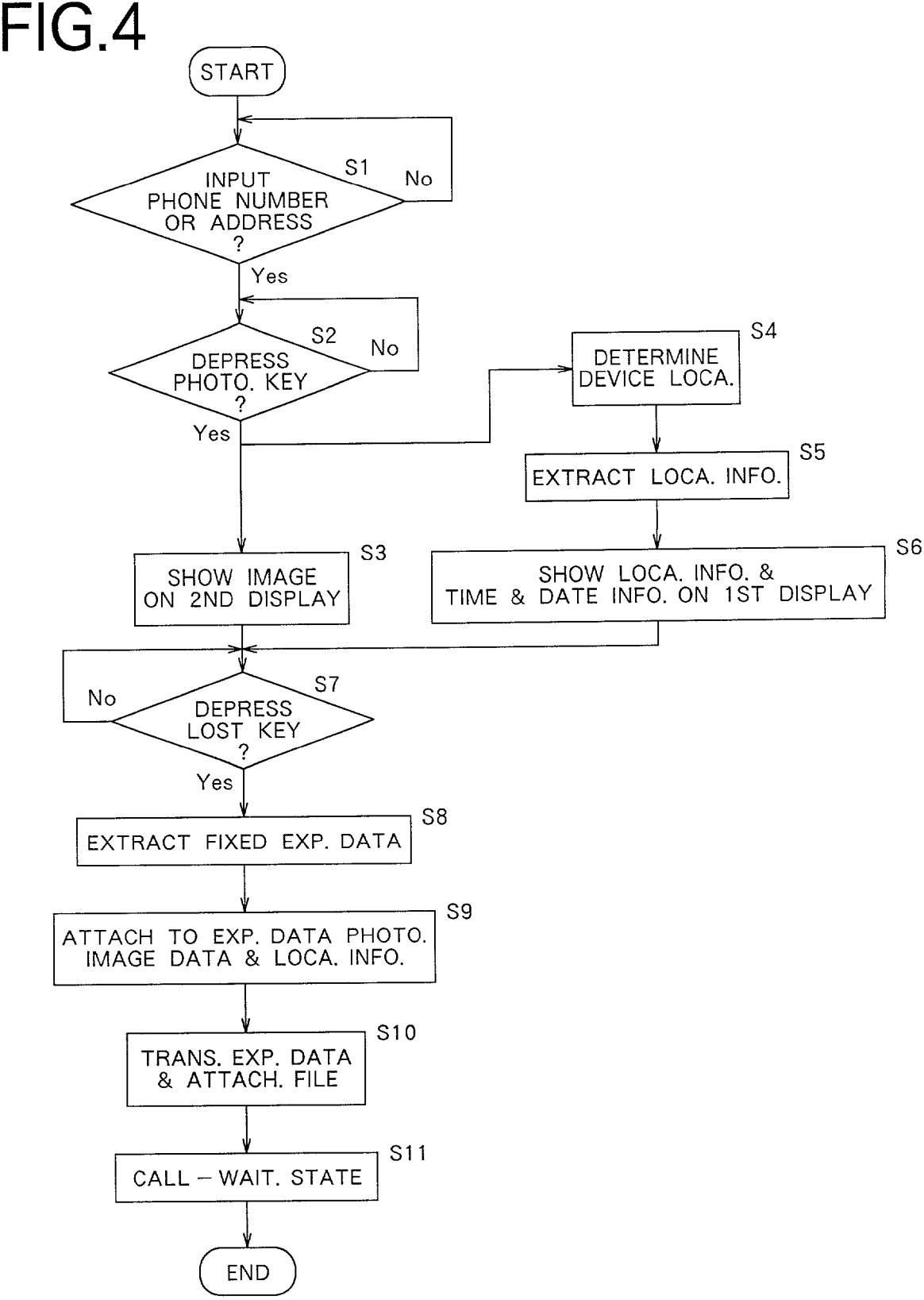
FIG. 4 is a flow chart showing the transmitting procedure of the location information which is executed on the portable telephone of the first embodiment.

The present invention provides a portable telephone capable of transmitting to other communication device terminals the location information obtained by the location information processing circuit as described above. FIG. 4 shows location information transmitting procedure executed on the portable telephone of the invention.

As illustrated, first in step S1, an inquiry is made whether either of a telephone number or e-mail address is inputted. If the answer is negative, the same inquiry is made in step S1. In the case where either of a telephone number or e-mail address is inputted by manipulation of numerical keys, or one or more telephone numbers or e-mail addresses are selected out of a plurality of telephone numbers and e-mail addresses pre-registered, the inquiry is answered in the affirmative in step S1 to be followed by step S2. In step S2 an inquiry is made whether a photograph key is depressed. If the answer is negative, the same inquiry is made in step S2.

In the case where the photograph key is depressed and the inquiry is answered in the affirmative in step S2, step S3 follows to show an image photographed by the CCD camera 4 on the second display 22 as shown in FIG. 6 while step S4 follows to determine a latitude and longitude of the telephone location, and current time and date based on a signal received by the GPS antenna 5. Step S5 thereafter follows to extract location information corresponding to the determined result, i.e., location information corresponding to the location of the portable telephone, out of a plurality of items of location information stored in the location information memory 51. Subsequently, step S6 follows to show on the first display 21 the extracted information, i.e., map information, address information, and current time and date information as shown in FIG. 6 and to show the location of the portable telephone superposed on the map information and indicated with a quadrangle mark on the map. In this step the location information shown on the first display 21 and the image data constituting the photographed image shown on the second display 22 are related to each other and recorded in the image memory 41.

Step S7 thereafter inquires whether a "LOST" key is depressed. If the answer is answered in the negative, the same inquiry is repeated in step S7. On the other hand, if the answer is affirmative, step S8 follows to extract, for example, fixed expression data indicating that "I get lost. I am here now." out of a plurality of pieces of fixed expression data recorded in the register memory 13. Thereafter, in step S9 the location information and the photographed image data recorded in the image memory 41 are each attached to the extracted fixed expression data as attached file data, as described above.

Further in step S10 the fixed expression data and two pieces of attached file data are transmitted to a switching office of the telephone line network. In step S11, thereafter, the telephone body is set into usual call-waiting state to complete the procedure.

According to the procedure described, when the user having the portable telephone described gets lost, the user inputs a telephone number or an e-mail address of the party whom the user is scheduled to meet and then depresses the photograph key in order to photograph the landscape or buildings in the vicinity with the telephone body set into a preferable position and direction, showing on the first display 21 the location of the telephone, i.e., the location information corresponding to the current location of the user, and showing on the second display 22 the image photographed by the CCD camera 4, as shown in FIG. 6. Thereafter, the user depresses the "LOST" key to transmit to the switching office of the telephone line network the fixed expression data, the location information shown on the first display 21, and the image data constituting the photographed image shown on the second display 22, and then the telephone body is returned to the usual call-waiting state.

Figure 5:
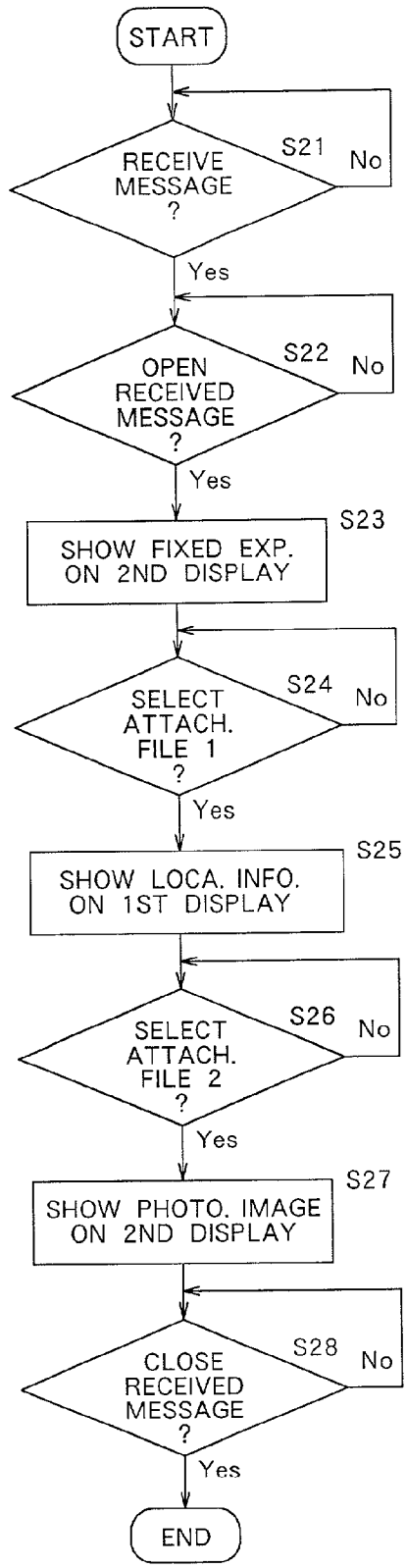
FIG. 5 is a flow chart showing the display procedure of the location information which is executed on the portable telephone upon the location information received.

FIG. 5 shows location information display procedure which the portable telephone executes upon the location information received. As illustrated, first in step S21 an inquiry is made as to whether or not a message is received. If the answer is negative, the same inquiry is repeated in step S21. On the other hand, if the answer is affirmative, step S22 follows to inquire whether or not manipulation for opening a file of the received message is performed. If the answer is negative, the same inquiry is repeated in step S22.

Figure 7:
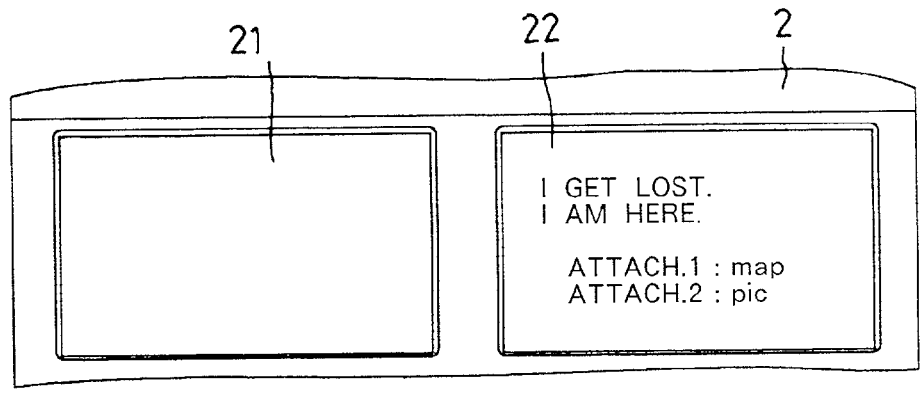
FIG. 7 is a front view showing an example of the fixed expressions shown on the second display when the location information is received.

In the case where the manipulation for opening a file of the received message is performed, and the inquiry for step S22 is answered in the affirmative, step S23 follows to show on the second display 22 the fixed expression, "I get lost. I am here now." and icons of "attached file 1" and "attached file 2", as shown in FIG. 7.

Figure 8:
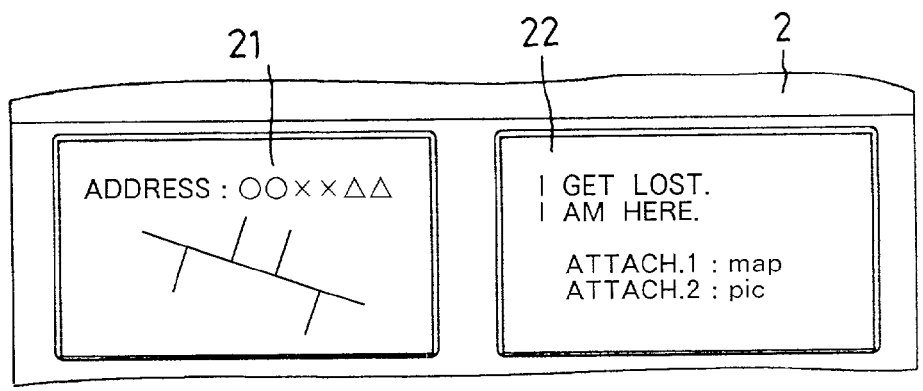
FIG. 8 is a front view showing an example of the location information shown on the first display when the location information is received.

Subsequently, in step S24 an inquiry is made as to whether or not the icon of "attached file 1" is selected. If the inquiry is answered in the negative, step S24 follows again. On the other hand, if the inquiry is answered in the affirmative, step S25 follows to show on the first display 21 the location information stored in the attached file 1, as shown in FIG. 8.

Figure 9:
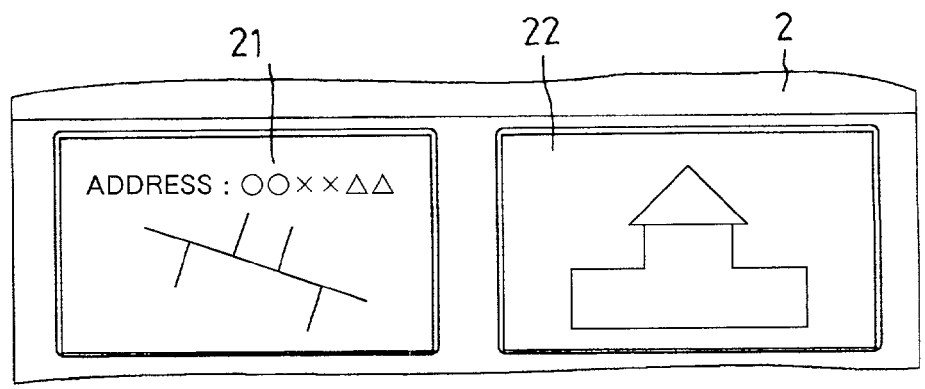
FIG. 9 is an example of the photographed image shown on the second display when the location information is received.

Next in step S26 an inquiry is made as to whether or not the icon of "attached file 2" is selected. If the inquiry is answered in the negative, step S26 follows again. On the other hand, if the inquiry is answered in the affirmative, step S27 follows to show on the second display 22 the photographed image having the image data stored in the attached file 2, as shown in FIG. 9.

Thereafter, step S28 inquires as to whether or not manipulation for closing the file of the received message is performed. If the answer is negative, step S28 follows again, while if the answer is affirmative, the procedure is completed.

With the specific procedure, in the case where the fixed expression data transmitted, the location information, and the image data are received as stated above, the user performs manipulation for opening the file of the received message at first to show on the second display 22 the expression saying "I get lost. I am here now.", as shown in FIG. 7. Thereafter, the user selects the icon of "attached file 1" shown on the second display 22 to show on the first display 21 the location information, i.e., the map information and the address information as shown in FIG. 8. Subsequently, the user selects the icon of "attached file 2" shown on the second display 22 to show the image photographed by the CCD camera as stated above on the second display 22 as shown in FIG. 9.

When the user of the portable telephone of the embodiment gets lost, the user inputs the telephone number or the e-mail address of the party whom the user is scheduled to meet, and then depresses the photograph key in order to photograph landscape or buildings in the vicinity with the telephone body set into a preferable position and direction, showing on the first display 21 the location information comprising the map information and the address information and the location of the portable telephone superposed on the map information and indicated with a quadrangle mark on the map as shown in FIG. 6. Therefore, the user is able to ascertain the accurate present location of the user. Further, because the image photographed by the CCD camera 4 is shown on the second display 22, the user can check how the photographed image of the image data to be transmitted to the party whom the user is scheduled to meet comes out. In this step the location information and the photographed image are shown on different displays 21, 22, respectively, so that the location information shown on the photographed image does not disturb the visibility of the location information. This allows both of the location information and the image to be shown clearly on the respective displays.

Thereafter, the user's depression of the "LOST" key transmits to the communication terminal device of the party whom the user is scheduled to meet, the location information corresponding to the location of the portable telephone determined by the GPS function and the image photographed by the CCD camera 4, i.e., the image of landscape and buildings in the user's vicinity. This enables the party to ascertain the accurate present location of the user.

Accordingly, the user performs manipulation for inputting a telephone number or an e-mail address of the party whom the user is scheduled to meet, and performs easy manipulation for depressing the photograph key and depressing the "LOST" key to allow the party to learn the present location of the user.

On the other hand, in the case where the party receives the fixed expression data, the location information, and the image data from the user getting lost, the party performs manipulation for opening the file of the received message as described above to show on the second display 22 the expression "I get lost. I am here now.", so that the party can ascertain that the user gets lost, and stays at the location indicated by the received location information. Thereafter, the party performs manipulation for selecting the attached file 1 to show on the first display 21 the location information transmitted by the user getting lost as shown in FIG. 8. The party further performs manipulation for selecting the attached file 2 to show on the second display 22 the photographed image indicated by the image data transmitted by the user getting lost as shown in FIG. 9. Therefore, the party can ascertain the accurate present location of the user.

Second Embodiment

A key input device of the portable telephone of the second embodiment is provided with a GPS key to be manipulated when the GPS processing circuit executes operation for determining the location of the telephone.

Figure 10:
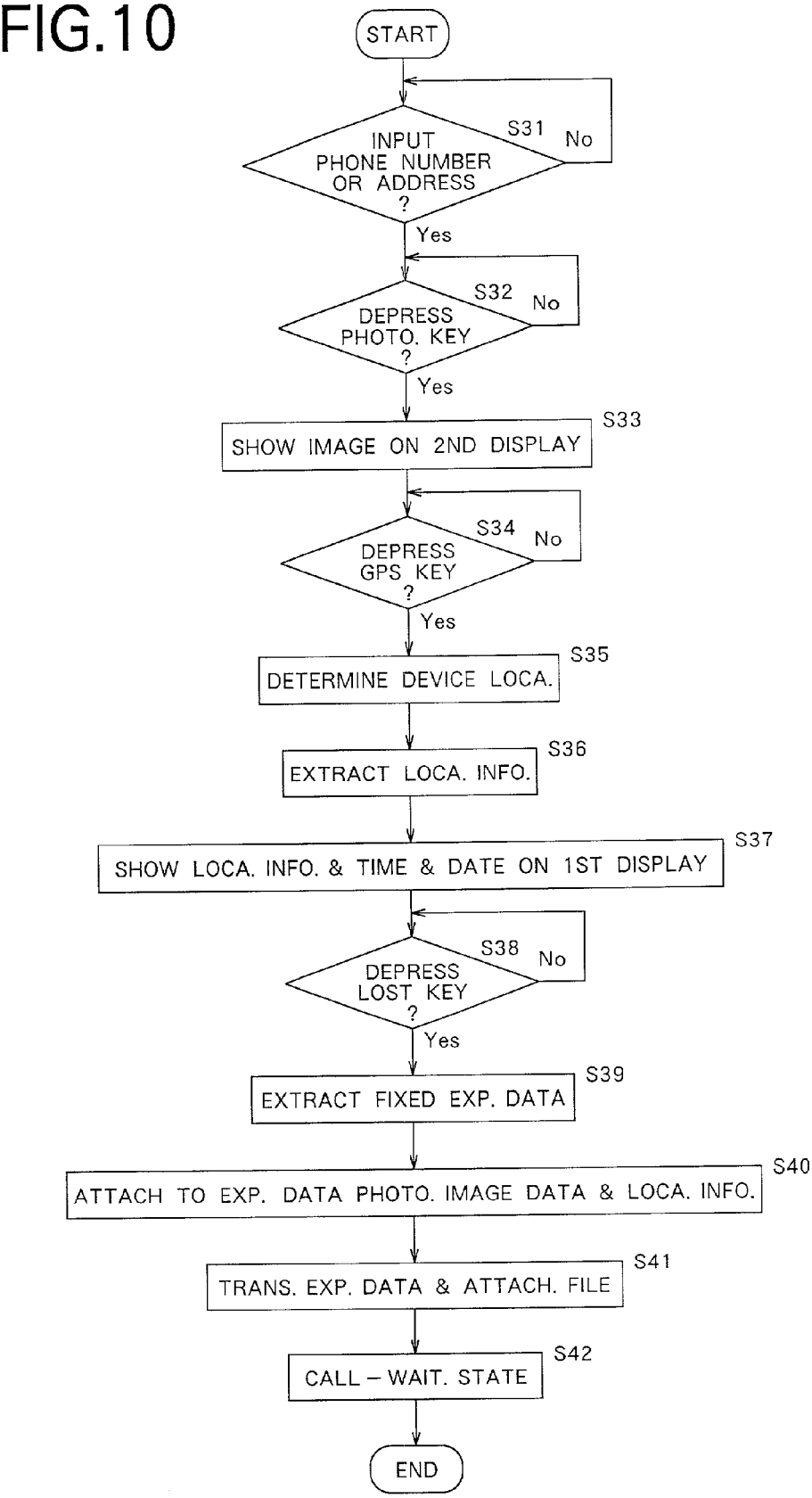
FIG. 10 is a flow chart showing the transmitting procedure of the location information which is executed on the portable telephone of the second embodiment.

FIG. 10 shows the location information transmitting procedure which is executed on the telephone of the embodiment. As illustrated, first in step S31 an inquiry is made as to whether or not either of a telephone number or an e-mail address is inputted. If the answer is negative, the same inquiry is repeated in step S31, while if the answer is affirmative, step S32 follows to inquire as to whether or not the photograph key is depressed. When the answer is negative, the same inquiry is repeated in step S32.

When the depression of the photograph key makes the answer affirmative in step S32, step S33 follows to show on the second display 22 the image photographed by the CCD camera 4.

Subsequently in step S34, an inquiry is made as to whether or not the GPS key is depressed. If the answer is negative, the same inquiry is repeated in step S34. On the other hand, if the answer is affirmative, step S35 follows to determine a latitude and longitude of the telephone location, and current time and date based on a signal received by the GPS antenna. Then step S36 extracts the location information corresponding to the determined result, i.e., the location information of the telephone location, out of a plurality of items of location information recorded in the location information memory 51.

Subsequently, in step S37, shown on the first display 21 are the extracted location information, i.e., the map information, the address information, the current date and time information, and the location of the portable telephone superposed on the map information and indicated with a quadrangle mark on the map, as shown in FIG. 6. In this step the photographed image and the location information shown on the first display 21 and the second display 22, respectively, are related to each other and recorded in the image memory 41.

Thereafter, in step S38 an inquiry is made as to whether or not the "LOST" key is depressed. If the inquiry is answered in the negative, the same inquiry is repeated in step S38. On the other hand, if the answer is affirmative, step S39 follows to extract, for example, fixed expression saying "I get lost. I am here now." out of a plurality pieces of fixed expressions stored in the register memory 13, and then in step S40 the location information and the photographed image data recorded in the image memory 41, as described above, are each attached to the extracted fixed expression data as attached file data.

Further, in step S41 the fixed expression data and the two pieces of attached file data are transmitted to the switching office of the telephone line network, and thereafter in step S42 the telephone body is set into the usual call-waiting state to complete the procedure.

With the specific procedure, when the user having the portable telephone described gets lost, the user inputs a telephone number or an e-mail address of the party whom the user is scheduled to meet, and thereafter depresses the photograph key to show on the second display 22 the image photographed by the CCD camera 4. Then the user depresses the GPS key to show on the first display 21 the location information corresponding to the location of the telephone, i.e., the current location of the user. The user further depresses the "LOST" key to transmit to the switching office of the telephone line network the fixed expression data, the location information shown on the first display 21, and the image data constituting the photographed image shown on the second display 22. Thereafter the telephone body is returned to the usual call-waiting state.

Third Embodiment

With the portable telephone of the third embodiment, operation for determining the location of the telephone is executed consecutively or intermittently by the GPS processing circuit.

Figure 11:
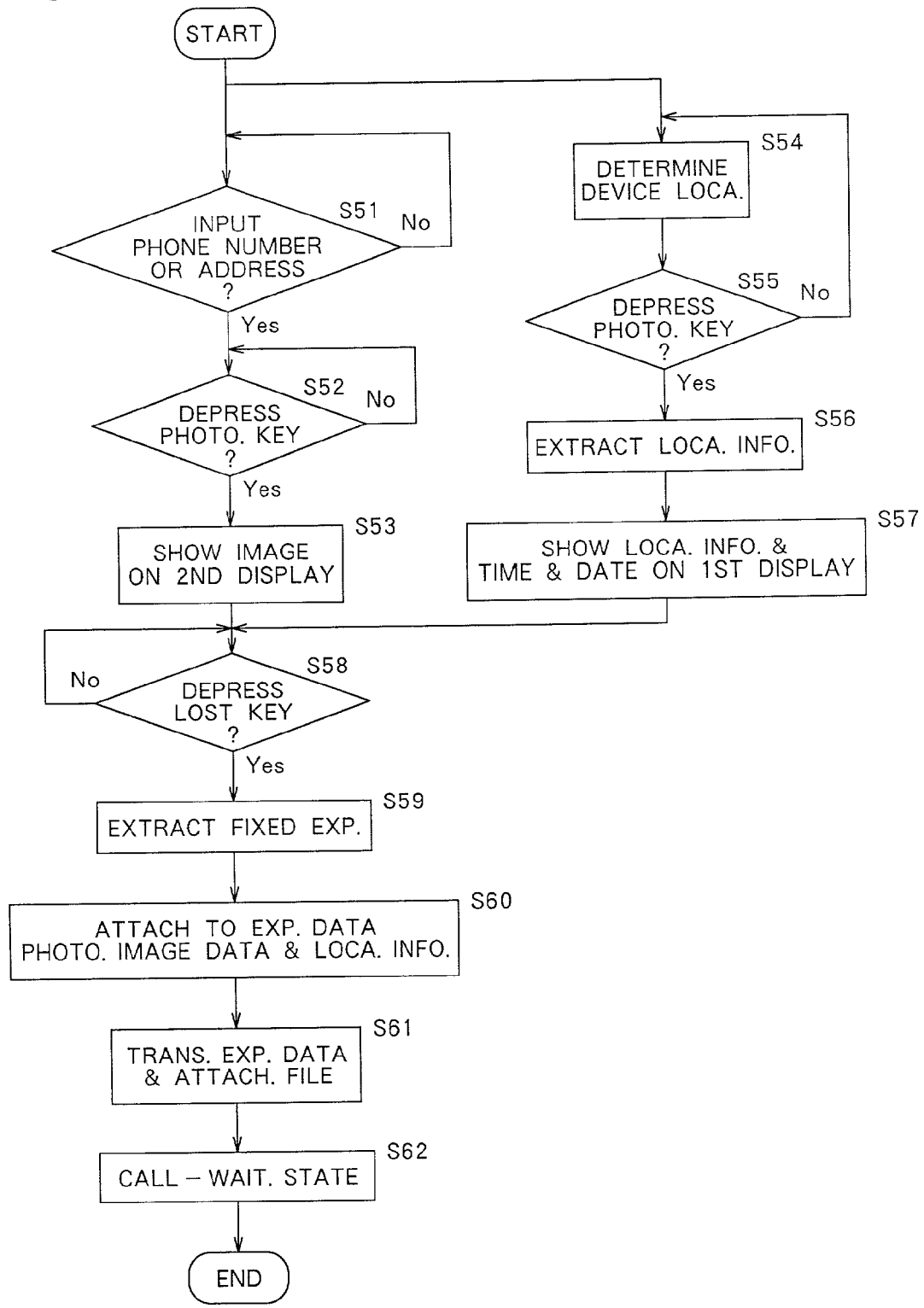
FIG. 11 is a flow chart showing the transmitting procedure of the location information which is executed on the portable telephone of the third embodiment.

FIG. 11 shows the location information transmitting procedure executed on the portable telephone of the embodiment. As illustrated, first in step S51 an inquiry is made as to whether the user inputs either a telephone number or an e-mail address. If the answer is negative, the same inquiry is repeated in step S51, while if the answer is affirmative, step S52 follows to inquire as to whether or not the photograph key is depressed. When the answer is negative, the same inquiry is repeated in step S52.

Furthermore, in parallel with the procedure described, step S54 follows to determine a latitude and longitude of the telephone location, and current time and date based on a signal received by the GPS antenna 5. Then step S55 inquires as to whether or not the photograph key is depressed. If the inquiry is answered in the negative, step S54 is followed again.

The depression of the photograph key makes the answer affirmative in step S52, followed by step S53 to show on the second display 22 the image photographed by the CCD camera 4 while the answer is affirmative in step S55, followed by step S56 to extract the location information corresponding to the determined result in step S54, i.e., the location information of the telephone location, out of a plurality of items of location information recorded in the location information memory 51. Subsequently, in step S57, shown on the first display 21 are the extracted location information, i.e., the map information, the address information, and the current date and time information, and the location of the portable telephone superposed on the map information and indicated with a quadrangle mark on the map, as shown in FIG. 6. In this step the photographed image and the location information shown on the first display 21 and the second display 22, respectively, are related to each other and recorded in the image memory 41.

Thereafter, in step S58 an inquiry is made as to whether or not the "LOST" key is depressed. If the inquiry is answered in the negative, the same inquiry is repeated in step S58. On the other hand, if the answer is affirmative, step S59 follows to extract, for example, the fixed expression saying "I get lost. I am here now." out of a plurality pieces of fixed expressions stored in the register memory 13, and then in step S60 the location information and the photographed image data recorded in the image memory 41 are each attached to the extracted fixed expression data as attached filed data, as described above.

Further, in step S61 the fixed expression data and the two pieces of attached file data are transmitted to the switching office of the telephone line network, and thereafter in step S62 the telephone body is set into the usual call-waiting state to complete the procedure.

With the specific procedure, the location of the telephone is determined consecutively or intermittently. When the user having the portable telephone described gets lost, the user inputs a telephone number or an e-mail address of the party whom the user is scheduled to meet, and thereafter depresses the photograph key to show on the second display 22 the image photographed by the CCD camera 4, and to extract the location information corresponding to the location of the telephone, showing the extracted location information on the first display 21. The user thereafter depresses the "LOST" key to transmit to the switching office of the telephone line network the fixed expression data, the location information shown on the first display 21, and the image data constituting the photographed image shown on the second display 22. Thereafter the telephone body is returned to the usual call-waiting state.

The embodiment described above is intended to illustrate the present invention and should not be construed as limiting the invention set forth in the appended claims or reducing the scope thereof. Furthermore, the device of the invention is not limited to the embodiment in construction but can of course be modified variously without departing from the scope of the invention as set forth in the claims.

Although the invention is embodied as portable telephones comprising two displays of the first and the second displays 21, 22 with every embodiment of the first to the third embodiments, for example, the invention can also be embodied as portable telephones comprising one or the given number of displays.

With the portable telephone provided with one display, the location information and the photographed image can be shown as arranged side by side at the same time, or the location information and the photographed image can be shown successively according to the user's manipulation.

Further, with every embodiment of the first to the third embodiments, as illustrated in FIG. 3, the register memory 13, the image memory 41, and the location information memory 51 are three physically different memories. The given two or all memories of these three memories can be formed into a physically same memory.

Furthermore, instead of the telephone antenna 3 and the GPS antenna 5, an antenna can be used functioning as both of the telephone antenna and the GPS antenna.

Further, the image data constituting the image photographed by the CCD camera 4 can be compressed and transmitted.

What is claimed is:

1. A portable communication device, comprising:
   an image pickup device,
   location data receiving means for receiving reference location data from a plurality of location base stations provided on satellites and/or the ground,
   location detection means for detecting location information indicating a location of the device based on the reference location data received by the location data receiving means,
   information input means for inputting identifying information of a communication terminal device to which the location information is to be transmitted,
   a send key to be manipulated when the location information is transmitted to the communication terminal device, and
   transmitting means for converting the location information detected by the location detection means and image data obtained from photography taken by the image pickup device at a location of a user to a radio signal and transmitting the radio signal to the communication terminal device having the inputted identifying information via a switching office of the telephone line network, when the transmitting key is manipulated, thereby permitting a person viewing the communication terminal device to determine the location of the user of the portable communication device,
   wherein said portable communication device further comprises:
   two or more displays for showing information,
   transmit display processing means for showing the location information detected by the location detection means on one of the two or more displays and the image photographed by the image pickup device in response to user manipulation on another of the two or more displays, and
   storage means for storing the location information and data of the image,
   wherein the transmitting means converts to the radio signal and transmits the location information and the image data when the transmitting key is manipulated with the location information and the image shown on the display.

2. A portable communication device according to claim 1, wherein when the send key is manipulated, the transmitting means converts to a radio signal notification information that a location indicated by the location information is a present location of the user to transmit the radio signal to the communication terminal device having the inputted identifying information via the switching office of the telephone line network.

3. A portable communication device according to claim 1, wherein the location detection means comprises:
   information storage means for storing therein a plurality of items of location information including map information and/or address information, and
   information extraction means for extracting one item of location information indicating the location of the portable communication device out of the plurality of items of location information based on the reference location data received.

4. A portable communication device according to claim 1, wherein the device is equipped with two displays, and the transmit display processing means has the detected location information shown on one display, and has the image photographed by the image pickup device shown on the other display.

5. A portable communication device according to claim 4, further comprising:
   radio signal receiving means for receiving a radio signal from the switching office of the telephone line network, and receiving display processing means for showing on one of the displays the location information constituting the radio signal received by the radio signal receiving means, and showing on the other display the image having image data constituting the radio signal.

6. A portable communication device according to claim 1, wherein each item of location information includes map information at least, and the transmit display processing means has the location of the device shown to be superposed on the map information shown on the one or more displays.

7. A portable communication device according to claim 1, further comprising:
   radio signal receiving means for receiving a radio signal from the switching office of the telephone line network, and
   receiving display processing means for showing on one or more displays the location information constituting the radio signal received by the radio signal receiving means and the image having image data constituting the radio signal.

8. A portable communication device, comprising:
   an image pickup device,
   location data receiving means for receiving reference location data from a plurality of location base stations provided on satellites and/or the ground,
   location detection means for detecting location information indicating a location of the device based on the reference location data received by the location data receiving means,
   information input means for inputting identifying information of a communication terminal device to which the location information is to be transmitted,
   a send key to be manipulated when the location information is transmitted to the communication terminal device,
   two or more displays for showing information,
   display processing means for showing the location information detected by the location detection means on one of the two or more displays, and the image photographed by the image pickup device at a location of a user on another of the two or more displays, in response to user manipulation,
   storage means for storing the location information and data of the image, and
   transmitting means for converting the location information and the image data stored in the storing means to a radio signal and transmitting the radio signal to the communication terminal device having the inputted identifying information via a switching office of the telephone line network, when the transmitting key is manipulated with the location information and the image shown on the display, thereby permitting a person viewing the communication terminal device to determine the location of the user of the portable communication device.

* * * * *